(12) United States Patent
Miller

(10) Patent No.: US 9,871,431 B2
(45) Date of Patent: Jan. 16, 2018

(54) SPINTRONIC GENERATOR

(71) Applicant: SEARL MAGNETRONIX, LLC, Fort Lauderdale, FL (US)

(72) Inventor: Kirk Miller, Reno, NV (US)

(73) Assignee: SPINTRONICS, INC., North Palm Beach, FL (US)

( * ) Notice: Subject to any disclaimer, the term of this patent is extended or adjusted under 35 U.S.C. 154(b) by 453 days.

(21) Appl. No.: 14/474,126

(22) Filed: Aug. 30, 2014

(65) Prior Publication Data

US 2015/0091397 A1    Apr. 2, 2015

Related U.S. Application Data

(60) Provisional application No. 61/872,641, filed on Aug. 31, 2013.

(51) Int. Cl.
*H02K 15/12* (2006.01)
*H02K 37/00* (2006.01)
*H02K 23/60* (2006.01)
*H02K 15/03* (2006.01)
*H02K 16/00* (2006.01)
*H02N 11/00* (2006.01)

(52) U.S. Cl.
CPC ........... *H02K 16/00* (2013.01); *H02N 11/008* (2013.01)

(58) Field of Classification Search
CPC ............................... H02N 11/00; H02K 16/00
USPC ........................ 310/46, 44, 115, 184, 156.34
See application file for complete search history.

(56) References Cited

U.S. PATENT DOCUMENTS

2013/0257208 A1*  10/2013  Samuels ................ H02K 1/223
                                                                        310/115

FOREIGN PATENT DOCUMENTS

FR          2463992 A1       2/1981
RU          2155435 C1 *     8/2000

OTHER PUBLICATIONS

Written Opinion of the International Searching Authority dated Jan. 29, 2015 for corresponding application PCT/US 2014/053612.
International Search Report mailed with Written Opinion (#1) for corresponding application PCT/US 2014/053612.

* cited by examiner

*Primary Examiner* — Jose Gonzalez Quinones
(74) *Attorney, Agent, or Firm* — Daniel S. Polley, P.A.

(57) ABSTRACT

A spintronic generator that provides electrical power with the motive force of natural electron spin. The utilization of natural electron spin can be enhanced with carefully matched materials, weights, and magnetic waveforms which provide precise pulsed frequencies in resonance with the materials. This resonance of the magnetic pulses provides clean abundant power. A utilization of the Zero Point Energy results in a local environment temperature drop which can be one of the sources of motive force. The harvesting of electricity can be in standard induction pick up coils controlled by direct current motor controllers using an LRC tank circuit.

36 Claims, 4 Drawing Sheets

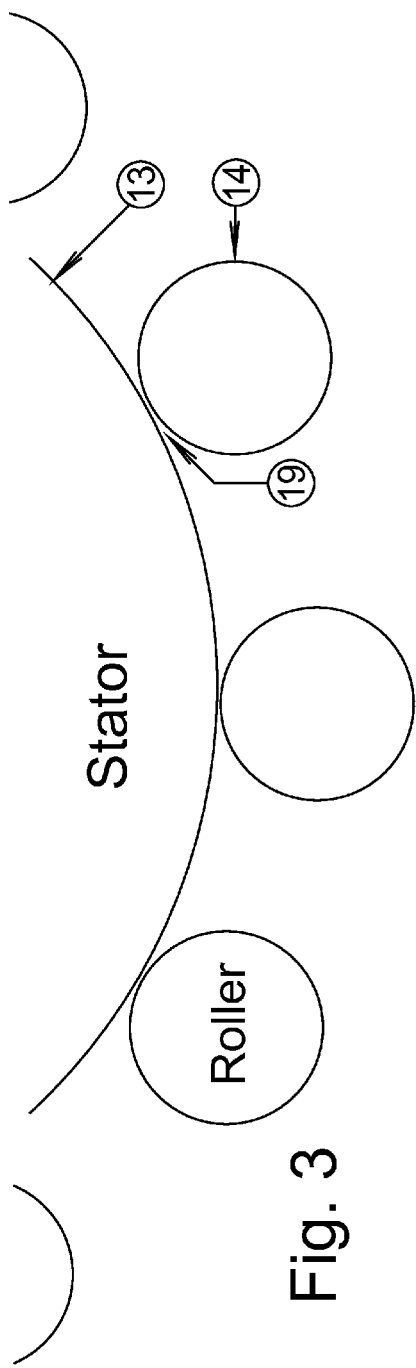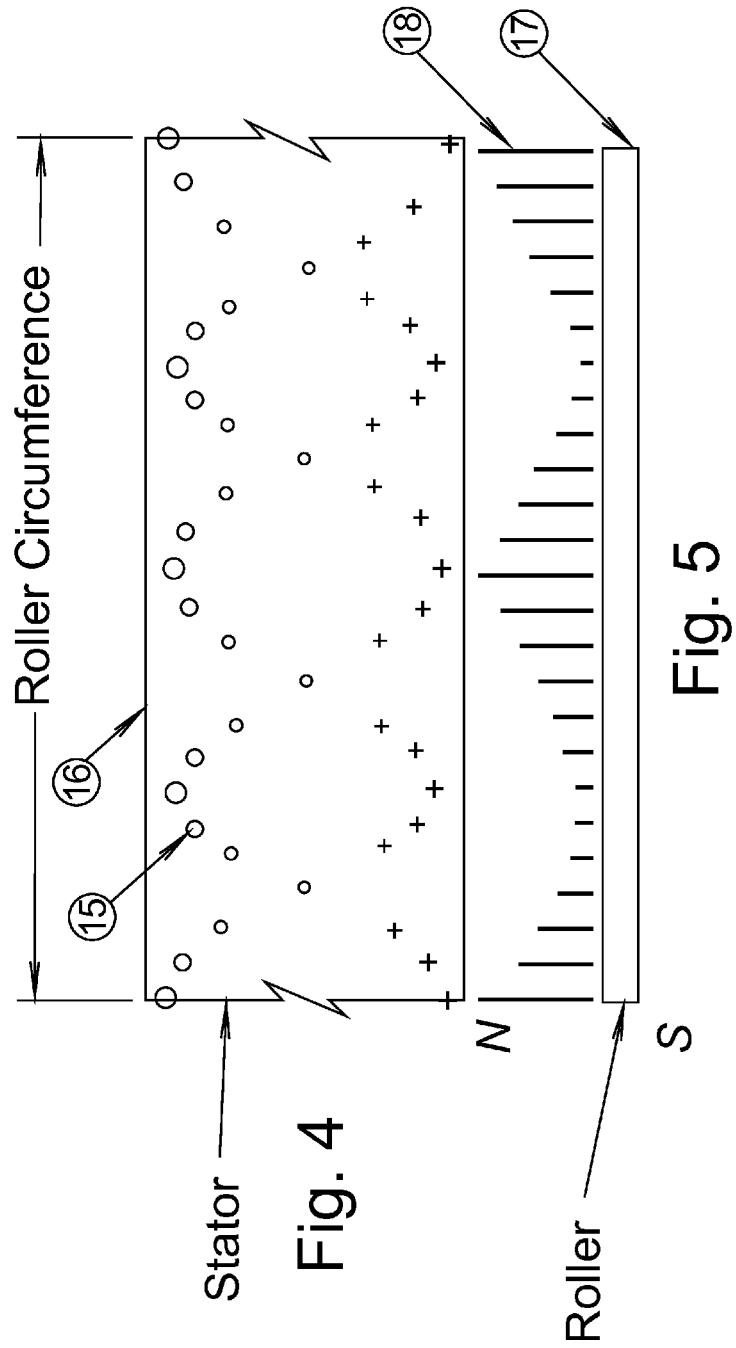

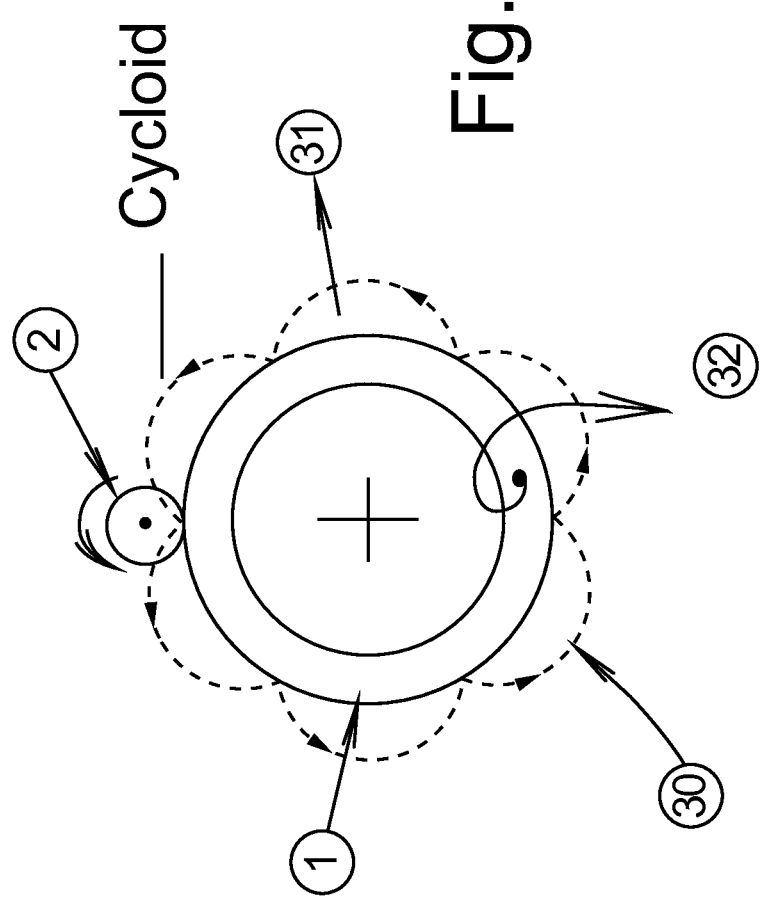

SPINTRONIC GENERATOR

This application claims the benefit of and priority to U.S. Provisional Patent Application Ser. No. 61/872,641, filed Aug. 31, 2014, which is incorporated by reference in its entirety.

1. FIELD OF THE INVENTION

This invention relates generally to electrical generators and in particular to permanent magnet rotational generators.

2. BACKGROUND

The Searl Effect provides a way for extracting clean and sustainable electrical energy. The Searl Effect Generator provides three uniquely magnetized fixed stator rings having patterns setup to generate continual motion of similarly magnetized cylindrical rollers. The rollers have both freedom of spin and rotation around the stator which generates both mechanical and electrical power.

SUMMARY OF THE INVENTION

The present invention relates to electron spin and the field of spintronics and provides for a spintronic generator. The present invention utilizes the application of large magnetic fields pulsed to micro sized magnetic fields to take advantage of magnetic tunnel junctions (hereinafter "MTJ"). Additional motive power is attained from Multiple Exciton Generation (hereinafter "MEG"), whereby a single absorbed photon of appropriately high energy can produce more than one electron-hole pair per absorbed photon.

The present invention provides electrical power with the motive force of natural electron spin. The utilization of natural electron spin can be enhanced with carefully matched materials, weights, and magnetic waveforms which provide precise pulsed frequencies in resonance with the materials. This resonance of the magnetic pulses coordinates the newly defined spintronics, MTJ, and MEG to provide clean abundant power. A utilization of the Zero Point Energy results in a local environment temperature drop which can be one of the sources of motive force. The harvesting of electricity can be via standard induction pick up coils controlled by direct current motor controllers using an LRC tank circuit.

BRIEF DESCRIPTION OF THE DRAWINGS

FIG. 3 is a plan view and close up of the inner Stator and Roller configuration in accordance with one embodiment of the present invention;

FIG. 4 is a flattened perimeter of the inner Stator showing one revolution of a Roller;

FIG. 5 is a flattened perimeter of one revolution of the perimeter of a Roller;

FIG. 7 is a plan view of the Cycloid movement of a particle on a segment.

DETAILED DESCRIPTION OF THE INVENTION

Figures 1, 2:
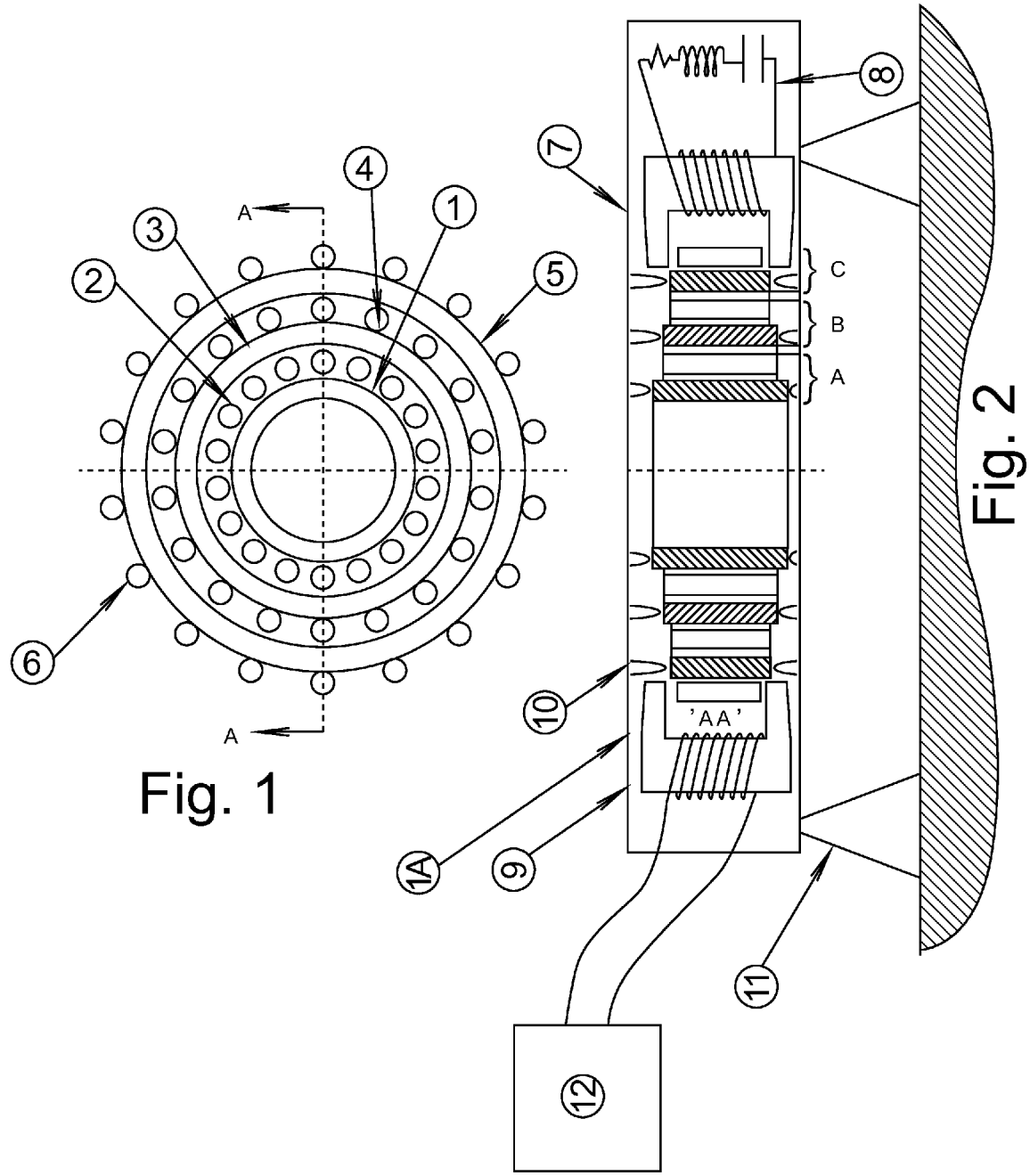
FIG. 1 is a plan view of one Stator and Roller configuration embodiment in accordance with the present invention.
FIG. 2 is a vertical cross section of FIG. 1.

Referring now to FIG. 1 and FIG. 2, the generator is generally identified as number 1A. The generator can comprise 3 concentric ring Stators (though such number is not considered limiting) shown as reference numbers 1, 3, and 5. Concentric ring Stators 1, 3 and 5 can be securely attached to the frame enclosure 9. Individual Stators can be held in place with pins 10. Frame enclosure 9 can be preferably securely attached to a floor or a building, but can also be securely attached to other objects. Between the Stators are Rollers 2, 4, and 6. Rollers 2, 4 and 6 can be loosely held in place by magnetic force imprinted on both the Stators and Rollers. The Rollers are free to move about their respective Stators. Though not considered limiting, the core 7 of the coil can be an appropriate sized laminated Mu metal "C" section, preferably wrapped with a coil 8, which can be integrated with appropriate capacitors, inductors, and resistors in order to control the speed and output of the generator. In addition, power can be inputted through this system to power the Rollers to the operating speed. Stanchions 11 or other appropriate supports can be sturdily attached to as permanent structure or the ground. Load controller 12 of the present invention can comprise an electronic array utilizing circuits and components to control the demands of the load required.

Now referring to FIG. 3, a close up of the Stator and the Rotor relationship is shown. Stator 13 can be a multiple size larger than Roller 14. As a non-limiting example, if Roller 14 is 1.5" or about 1.5" then Stator 13 can be 5 or about 5 times larger at 7.5' or about 7.5". Alternatively, Stator 13 can be 10 or about 10 times larger at 15" or about 15". The invention is not considered limited to any particular size multiplier for the differences in size between Stator 13 and Roller 14. However, the size multiplier selected can be preferably chosen to allow Roller 14 to spin an even number of turns around Stator 13. In addition, Stator 13 and Roller 14 can be clad with 99.9% pure copper, though such is not considered limiting. The use of copper attracts Eddy Currents which can affect Rollers 14 causing them to 'float' off Stator 13 as shown by space or gap 19 in FIG. 3. This floating relationship provides for a friction free Stator/Roller motion.

In accordance with the present invention, the imprinted magnetic waves can align the Rollers on the Stator so that they will circle in a vertical symmetrical position. The imprinted magnetic waves of the present invention when the Rollers are in motion, produces a kinetic magnetism and produces a constant asymmetric force on the Rollers. This force is the effect of the combination of the spintronics, MTJ, and MEG, discussed in more detail below.

Now referring to FIG. 4, the vertical form of the magnetic bubbles 15 imprinted on Stator 16 are shown. These magnetic bubbles can be imprinted in such a manner as to change in flux intensity from the outer edge of the Stator to the center, and then increase in the opposite polarity, from the center to the opposite edge. This wave form can be adjusted for varying results according to the need of the device. Shown in FIG. 4 is a double Sine wave, though such is not considered limiting.

Now referring, to FIG. 5, the perimeter of the Roller segment can be seen. The Roller segment 17 can be stacked in varying number and held together with magnetic force. In a non-limiting example, a stack of six segments can be used to make up one Roller. However, other number of segments can be used and are also considered within the scope of the invention. The wave form 18 can be imprinted to go North South through the disc segment, and can vary in flux intensity, for example matching the Stator period Sine wave, though such is not considered limiting. The wave form may also be imprinted axially into the individual segment in a Sine wave to match the Stator.

During the motion of the Rollers within generator 1A, a direct current can be induced as the speed of the Rollers increase. This induced current follows Faraday's Law, and the speed of the Rollers can be determined by the demands of the load by the coil 7, tank circuit 8, and load controller 12. The Rollers can follow a circular path, float off the Stators, and preferably operate without any friction in the machine. When the present invention is in resonance, a temperature drop can be witnessed, which can be silent and emits negative healthy ions into its environment.

Figure 6:
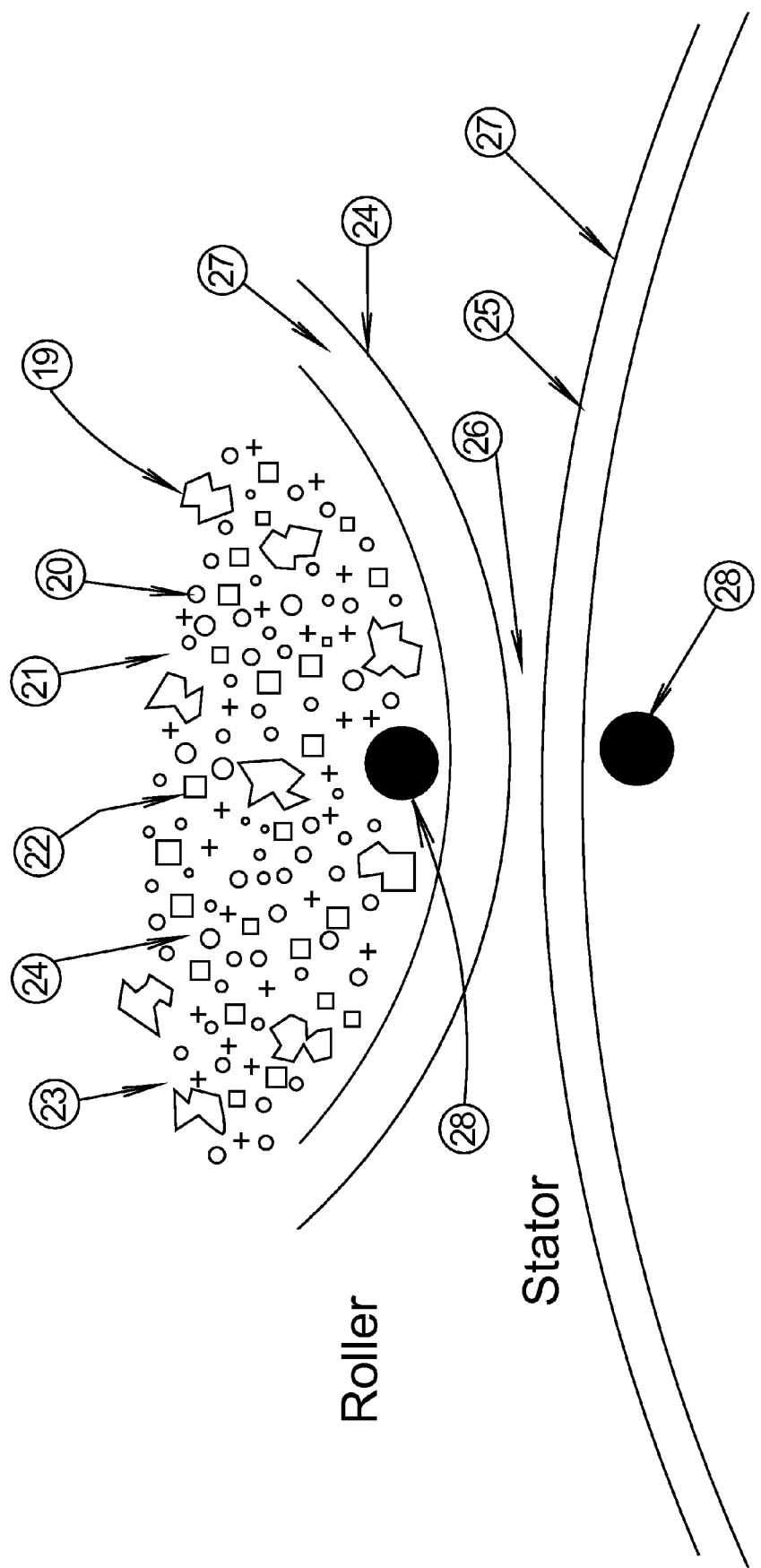
FIG. 6 is a close up view of the non-limiting elements and materials making up a Roller and Stator in accordance with the present invention.

Now referring to FIG. 6, non-limiting details of Roller 24 and Stator 25 are shown. The ring of 99.9% copper 27 can be a precise machined ring fitted over the either layered or homogenous mixture. In one non-limiting embodiment, the elements and compounds can be precisely mixed and prepared. Preferably, Roller 24 and the Stator do not contact, due to the Eddy Currents, and float at a distance 26. The layers, or the mixture, can consist of micron preferably sized from approximately 20 microns to approximately 90 microns, though such is not considered limiting. The elements can be one or more of the following: Aluminum Powder 19, Silicon powder 20, Sulfur powder 21, Titanium powder 22, Neodymium powder 23 and a Nylon binder 24, though such ingredients are not considered limiting. Any remainder of the powder can be Iron, though such is not considered limiting. The mixture can be either layered or mixed in an inert gas, and then preferably pressed under pressure and heat to obtain the correct size crystals. Magnetic bubbles 28 and 29 can be imprinted after the fabrication process is complete. The nature of the atomic weights, mass of each compound or element, and the sintering process can be designed such that the structure of the Rollers and Stator conform to the laws of Nature to enhance the orbital spin of the electron. In accordance with the present invention the Spintronics, MJT and MEG are utilized in order to resonate with the Zero Point Energy (hereinafter "ZPE"), and take advantage of the natural spin of the electron.

Now referring to FIG. 7, the cycloid movement of a particle in a Roller Segment 30 is shown. This cycloid movement ejects electrons in a straight line radially outward produced by the action of MJT and MEG. The emf and current between Stator 1 and Roller 2 can increase at each Concentric Stator/Roller assembly (i.e. between additional Stator 3/Roller 4 and then Stator 5/Roller 6). Finally, at the outer perimeter of the Spintronic Generator 1A, the resultant emf and current can be a robust and practical electrical current.

Again referring to FIG. 7, it is shown a plan view of the Golden Spiral 32 or a spiral which can be based on 'phi' which is the mechanism of accelerating and changing the torsion of spin of the ZPE into individual electrons out of the ZPE via the MJT and/or the MEG and all based on Torsion Spin Physics and Spintronics. This can be achieved by selection of elements, compounds, and mass that comply with the Golden Ratio, or 'phi.'

As also seen in FIG. 7, in one embodiment, during operation each runner can be spinning about its axis and can be simultaneously orbiting the plate in such a manner that a fixed point p on the curved runner surface can trace out a whole number of cycloids during one revolution round the plate, as shown by the dotted lines in FIG. 7.

Though the above shows multiple methods of building the details of the present invention device, this is not to the exclusion of other iterations that are also considered within the scope and spirit of the present invention.

Some of the benefits and advantages of the present invention, include, but are not limited to, the following:

1. The Spintronic Generator 1A converts Zero Point Energy into a robust and useful practical source of pulsed Direct Current electricity. The current can be converted and used as AC, DC, at selected voltages, Hertz, and amperages. The geometric configuration of the device can be used, along with the special materials, the special magnetization, and exact ratio of materials. The spin of the Rollers about the Stators is one of the novel features of the machine and present invention;
2. The Eddy Currents between the Rollers and Stators make the device friction free due to the space between them and greatly reduces internal losses due to lack of mechanical parts interacting. The Rollers follow the circular path without centripetal force as they are following the magnetic path naturally produced by the machine;
3. The device emits negative ions in its vicinity which enhances the health of the surrounding environment. The negative ions are an additional benefit from the emission of electrons. In addition, the surrounding environment will have a drop in temperature due to the conversion of ZPE into electrons;
4. The device powers the Rollers about the Stators due to asymmetric magnetic forces formed by the kinetic magnetic waveform bubbles interacting with micro magnetic particles within the device due to motion between them. Additionally the Rollers, once in motion, follow Faraday's right hand current rule which adds further motive force to the Rollers;
5. The device will exhibit a weight loss as it enters high levels of power output. This is due to torsion physics, and is still in the formative stages of scientific discovery due to the complex nature of gravity;
6. The speed of the device is dependent on the electrical load that is taken from the device. This is counter intuitive as existing electric motors require an increase in mechanical power as the load increases. The Spintronic Generator of the present invention is in tune with nature, and uses the ZPE only as required by the load;
7. The conversion of the ZPE into electrons by the present invention including in view of combination of materials, mass, and geometry selected. The alignment of the materials to the natural Golden Ratio assists in the success of the conversion of the ZPE. Not only the choice of materials, but their crystalline structure can be considered for the Quantum conversion winch will build into a Micro conversion, then a practical conversion of power in the device;
8. The magnetic impression on the Rollers and Stators is another novel feature of the device and present invention. An interrupted magnetic waveform is a part of the process, and the frequencies of the various impressed magnetic bubbles as the Roller moves is also considered for the conversion of ZPE into electrons;
9. The electrical characteristics of the Spintronic Generator can be varied by the use of layers of the elements and compounds. In one non-limiting embodiment, the inner layer of the Stator and Roller can be Neodymium, then a dielectric, then a magnet, then a copper layer. These elements and compounds can be carefully arranged to conform to the Golden Ratio;
10. The harvesting of the power can be carefully controlled with an LRC tank circuit of the motor controller variety. The controller circuit keeps the Spintronic generator in Resonance. One characteristic of the controller is in the preferred use of large amounts of capacitance;

11. The formation of the elements and compounds for use with the present invention involves preparation and consideration in particle size, sintering, and pressure molding in order to maintain the resonance required for the Torsion Physics to produce the required result. This facilitates MJT and MEG; and 12. The release of photons facilitate the MEG and the torsion within the device tunneling through the magnetic fields in motion forms Bosons thereby increasing the energy production within the Spintronics Generator.

13. The rotation of the rollers about each stator establishes mechanical oscillations between the magnetic bubbles on the roller and stator. This mechanical oscillation emits radio frequency (hereinafter "rf") waves. The variation in spacing of the magnetic bubbles produces frequency modulated rf (FM), and the variation in the flux intensity of the magnetic bubbles produces amplitude modulated rf (AM). The variation in flux intensity and spacing can be tuned to bring the rf in resonance with the magnetic reservoir in order to harmonize the device into resonance. Thus, the present invention device can provide for a lossless or virtually lossless magnetic oscillator when resonance is achieved.

14. A nanoglass powder can be added to the mix of powders to enhance and accelerate the production of electron reactions in the spinning device. This nanoglass material may also reduce the need for expensive rare earths thereby reducing the manufacturing cost of the machine. The nanoglass powder can be produce having characteristics of electron nanocapacitor qualities and can be used to multiply the MTJ effect in addition to multiplying the exciton photon pair reaction. In certain conditions the material can also act as a superconductor at room temperature.

All locations, sizes, shapes, proportions, measurements, amounts, angles, component locations, part locations, fasteners, configurations, weights, dimensions, values, percentages, ranges, materials, ingredients and or orientations discussed above or shown in the figures are merely by way of example and are not considered limiting and other locations, sizes, shapes, proportions, measurements, amounts, angles, component locations, part locations, fasteners, configurations, weights, dimensions, values, percentages, ranges, materials, ingredients and/or orientations can be chosen and used and all are considered within the scope of the invention.

Dimensions and/or proportions of certain parts in the figures may have been modified and/or exaggerated for the purpose of clarity of illustration and are not considered limiting.

While the invention has been described and disclosed in certain terms and has disclosed certain embodiments or modifications, persons skilled in the art who have acquainted themselves with the invention, will appreciate that it is not necessarily limited by such terms, nor to the specific embodiments and modification disclosed herein. Thus, a wide variety of alternatives, suggested by the teachings herein, can be practiced without departing from the spirit of the invention, and rights to such alternatives are particularly reserved and considered within the scope of the invention.

What is claimed is:

1. A stator/roller configuration for use as part of a spintronic generator comprising,
   a first stator;
   a second stator concentric with the first stator and spaced away from the first stator to define a first area between an outer surface of the first stator and an inner surface of the second stator;
   a third stator concentric with the second stator and first stator and spaced away from the second stator to define a second area between an outer surface of the second stator and an inner surface of the third stator;
   a first plurality of rollers disposed around the first stator and within the first area without contacting the outer surface of first stator or the inner surface of the second stator during use;
   a second plurality of rollers disposed around the second stator and within the second area without contacting the outer surface of the second stator or the inner surface of the third stator during use; and
   a third plurality of rollers disposed around the third stator without contacting an outer surface of the third stator during use;
   wherein the stators are imprinted with magnetic bubbles.

2. The stator/roller configuration of claim 1 wherein the first stator, second stator and third stator are secured to a frame enclosure.

3. The stator/roller configuration of claim 1 wherein a magnetic force is imprinted on the first, stator, second stator, third stator, first plurality of rollers, second plurality of rollers and third plurality of rollers to retain such in place with respect to each other.

4. The stator/roller configuration of claim 1 wherein said first plurality of rollers free to move about said first stator, said second plurality of rollers free to move about said second stator and said third plurality of rollers free to move about said third stator.

5. The stator/roller configuration of claim 1 wherein said stators are sized larger than said rollers by a multiple ranging from about 1.5 times larger to about 10 times larger.

6. The stator/roller configuration of claim 1 wherein said stators and said rollers are clad with copper.

7. The stator/roller configuration of claim 6 wherein the copper is 99.9% pure copper to attract Eddy Currents.

8. The stator/roller configuration of claim 1 wherein the magnetic bubbles are imprinted on the stators such that a change in flux intensity from an outer edge of the stators to a center area of the stators is achieved and then an increase in an opposite polarity from the center area to an opposite edge of the stators.

9. The stator/roller configuration of claim 1 wherein each roller can be made up of stacked segments held together by magnetic force.

10. The stator/roller configuration of claim 9 wherein each roller can be imprinted with a North South wave form.

11. The stator/roller configuration of claim 10 wherein the wave form of each roller is matched to a wave form period generated for the stators by the magnetic bubbles imprinted on the stators.

12. The stator/roller configuration of claim 1 wherein each roller and stator are constructed from multiple layers with an inner neodymium layer, followed by a dielectric followed by a magnet and an outer copper layer.

13. The stator/roller configuration of claim 1 wherein each roller comprising an outer copper layer housing a mixture comprising aluminum powder, silicon powder, sulfur powder, titanium powder, neodymium powder and a binder.

14. The stator/roller configuration of claim 13 wherein the mixture further comprising a nanoglass powder.

15. A spintronic generator comprising,
a first stator;
a second stator concentric with the first stator and spaced away from the first stator to define a first area between an outer surface of the first stator and an inner surface of the second stator;
a third stator concentric with the second stator and first stator and spaced away from the second stator to define a second area between an outer surface of the second stator and an inner surface of the third stator;
a first plurality of rollers disposed around the first stator and within the first area without contacting the outer surface of first stator or the inner surface of the second stator during use;
a second plurality of rollers disposed around the second stator and within the second area without contacting the outer surface of the second stator or the inner surface of the third stator during use;
a third plurality of rollers disposed around the third stator without contacting an outer surface of the third stator during use;
a core wrapped with a first coil and positioned adjacent the third plurality of rollers;
a tank circuit in communication with the first coil; and
a load controller in communication with a coil wrapped around a core;
wherein said first plurality of rollers free to move about said first stator, said second plurality of rollers free to move about said second stator and said third plurality of rollers free to move about said third stator.

16. The spintronic generator of claim 15 wherein the rollers while spinning also follow a circular path around associated stators without the rollers contacting the stator to allow the generator to operate without friction.

17. The spintronic generator of claim 15 wherein at resonance a temperature drop is achieve which causes negative healthy ions to be emitted into a surrounding environment.

18. The stator/roller configuration of claim 15 wherein the first stator, second stator and third stator are secured to a frame enclosure.

19. The stator/roller configuration of claim 15 wherein a magnetic force is imprinted on the first, stator, second stator, third stator, first plurality of rollers, second plurality of rollers and third plurality of rollers to retain such in place with respect to each other.

20. The stator/roller configuration of claim 15 wherein said stators are sized larger than said rollers by a multiple ranging from about 1.5 times larger to about 10 times larger.

21. The stator/roller configuration of claim 15 wherein said stators and said rollers are clad with copper.

22. The stator/roller configuration of claim 21 wherein the copper is 99.9% pure copper to attract Eddy Currents.

23. The stator/roller configuration of claim 15 wherein said stators are imprinted with magnetic bubbles.

24. The stator/roller configuration of claim 23 wherein the magnetic bubbles are imprinted on the stators such that a change in flux intensity from an outer edge of the stators to a center area of the stators is achieved and then an increase in an opposite polarity from the center area to an opposite edge of the stators.

25. The stator/roller configuration of claim 15 wherein each roller can be made up of stacked segments held together by magnetic force.

26. The stator/roller configuration of claim 25 wherein each roller can be imprinted with a North South wave form.

27. The stator/roller configuration of claim 26 wherein the wave form of each roller is matched to a wave form period generated for the stators by a plurality of magnetic bubbles imprinted on the stators.

28. The stator/roller configuration of claim 15 wherein each roller and stator are constructed from multiple layers with an inner neodymium layer, followed by a dielectric followed by a magnet and an outer copper layer.

29. The stator/roller configuration of claim 15 wherein each roller comprising an outer copper layer housing a mixture comprising aluminum powder, silicon powder, sulfur powder, titanium powder, neodymium powder and a binder.

30. The stator/roller configuration of claim 29 wherein the mixture further comprising a nanoglass powder.

31. A spintronic generator comprising,
a first stator secured to a frame;
a second stator secured to the frame and concentric with the first stator and spaced away from the first stator to define a first area between an outer surface of the first stator and an inner surface of the second stator;
a third stator secured to the frame and concentric with the second stator and first stator and spaced away from the second stator to define a second area between an outer surface of the second stator and an inner surface of the third stator;
a first plurality of rollers disposed around the first stator and within the first area without contacting the outer surface of first stator or the inner surface of the second stator during use;
a second plurality of rollers disposed around the second stator and within the second area without contacting the outer surface of the second stator or the inner surface of the third stator during use;
a third plurality of rollers disposed around the third stator without contacting an outer surface of the third stator during use;
a core wrapped with a first coil and positioned adjacent the third plurality of rollers;
a tank circuit in communication with the first coil; and
a load controller in communication with a coil wrapped around a core;
wherein each of said stators and each of said rollers are clad with 99.9% pure copper to attract Eddy Currents and cause a gap to be formed between the rollers and stators so that they do not contact each other in operation of the generator;
wherein said first plurality of rollers free to move about said first stator, said second plurality of rollers free to move about said second stator and said third plurality of rollers free to move about said third stator;
wherein said stators are imprinted with magnetic bubbles such that a change in flux intensity from an outer edge of the stators to a center area of the stators is achieved and then an increase in an opposite polarity from the center area to an opposite edge of the stators;
wherein each roller can be imprinted with a North South wave form which is matched to a wave form period generated for the stators by the plurality of magnetic bubbles imprinted on the stators;
wherein the rollers while spinning also follow a circular path around associated stators without the rollers contacting the stator to allow the generator to operate without friction;

wherein at resonance a temperature drop is achieve which causes negative healthy ions to be emitted into a surrounding environment.

32. The stator/roller configuration of claim 31 wherein a magnetic force is imprinted on the first, stator, second stator, third stator, first plurality of rollers, second plurality of rollers and third plurality of rollers to retain such in place with respect to each other.

33. The stator/roller configuration of claim 31 wherein said stators are sized larger than said rollers by a multiple ranging from about 1.5 times larger to about 10 times larger.

34. The stator/roller configuration of claim 31 wherein each roller and stator are constructed from multiple layers with an inner neodymium layer, followed by a dielectric followed by a magnet and an outer copper layer.

35. The stator/roller configuration of claim 31 wherein each roller comprising an outer copper layer housing a mixture comprising aluminum powder, silicon powder, sulfur powder, titanium powder, neodymium powder and a binder.

36. The stator/roller configuration of claim 35 wherein the mixture further comprising a nanoglass powder.

* * * * *